Oct. 2, 1923.  
L. E. WILLETT  
1,469,401  
AUTOMOBILE STEERING GEAR LOCK  
Filed Oct. 8, 1921
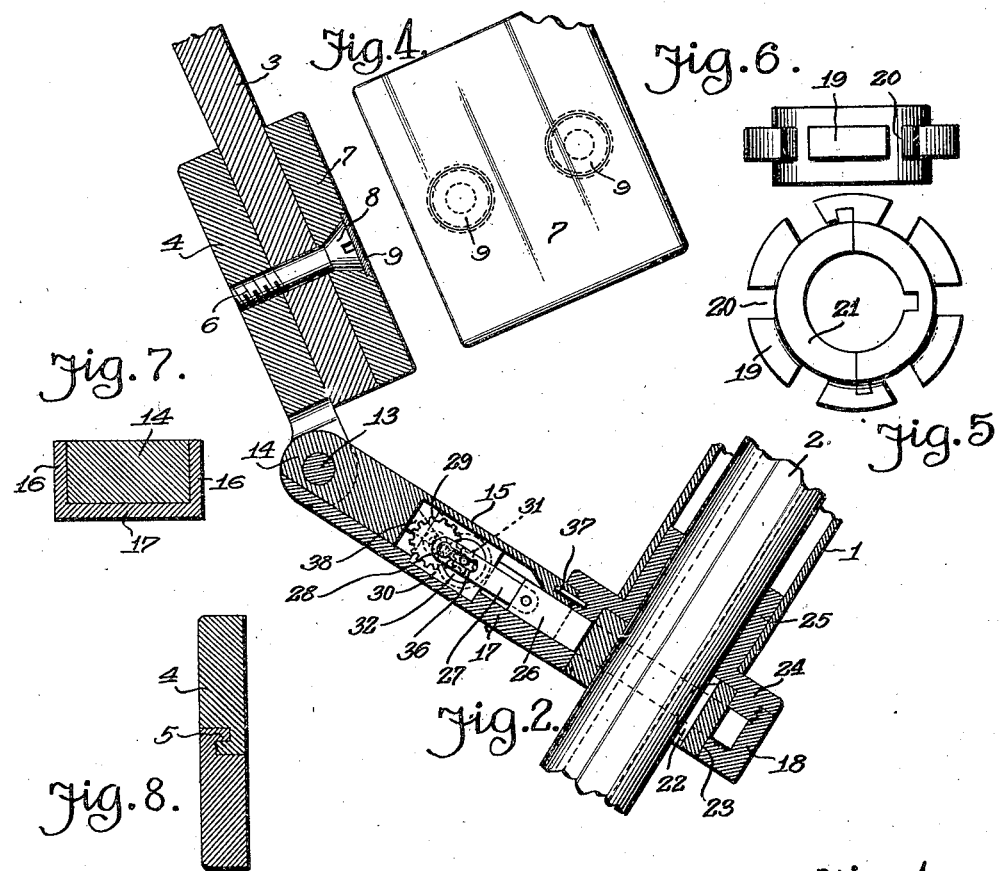
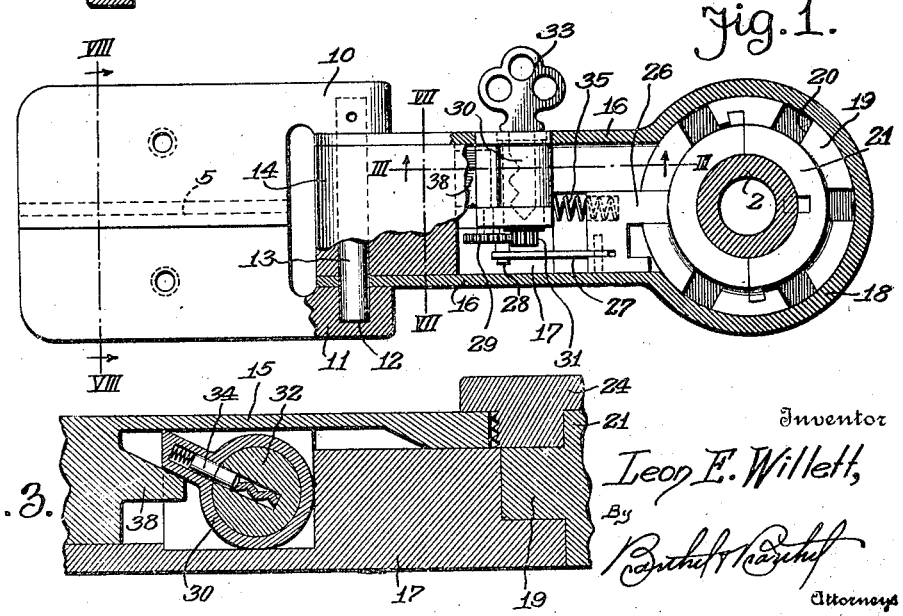
Inventor  
Leon E. Willett,  
By  
Barthel & Barthel  
Attorneys Patented Oct. 2, 1923.

1,469,401

UNITED STATES PATENT OFFICE.

LEON E. WILLETT, OF DETROIT, MICHIGAN.

AUTOMOBILE STEERING-GEAR LOCK.

Application filed October 8, 1921. Serial No. 506,249.

*To all whom it may concern:*

Be it known that I, LEON E. WILLETT, a citizen of the United States of America, residing at Detroit, in the county of Wayne and State of Michigan, have invented certain new and useful Improvements in Automobile Steering-Gear Locks, of which the following is a specification, reference being had therein to the accompanying drawings.

This invention relates to an automobile steering gear lock and has special reference to a locking mechanism for a steering shaft that is in proximity to a dash or instrument board with the steering shaft and instrument board angularly disposed relative to each other.

The primary object of my invention is to furnish a steering column assembly with a locking mechanism which may be mounted on the steering shaft of the assembly and attached to the instrument board, the locking mechanism including two parts adjustable relative to each other to compensate for any difference of angularity between the instrument board and the steering shaft.

Another object of this invention is to provide a key operated locking mechanism for a steering shaft that will prevent an automobile, motor boat or the like from being surreptitiously operated by unauthorized persons, the mechanism including a well known type of key tumbler lock and the arrangement of the lock is such that easy access may be had thereto, while the construction of the locking mechanism is such that the elements cannot interfere with the use of the lock.

A further object of my invention is to provide a strong, durable and inexpensive locking mechanism that may be easily, quickly and safely installed, and the construction of the mechanism will be hereinafter described and then claimed.

Reference will now be had to the drawing, wherein

Figure 1 is a plan of the locking mechanism partly broken away and partly in horizontal section;

Fig. 2 is a vertical sectional view of the same showing a portion of an instrument board relative to a portion of a steering shaft;

Fig. 3 is a longitudinal sectional view taken on the line III—III of Fig. 1;

Fig. 4 is an elevation of a face plate adapted to be attached to the instrument board;

Fig. 5 is a plan of the detached sectional keeper member;

Fig. 6 is a side elevation of the same;

Fig. 7 is a cross sectional view taken on the line VII—VII of Fig. 1, and

Fig. 8 is a similar view taken on the line VIII—VIII of Fig. 1.

In the drawing, the reference numeral 1 1 denotes a steering column or casing through which extends a steering shaft 2 and the lower end of the casing 1 ordinarily terminates contiguous to the lower edge of an instrument board or dash 3, said instrument board being disposed at an angle relative to the steering shaft 2. These elements may be found in a well known type of automobile, also motor boat construction.

Attached to the rear face of the instrument board 3, at the lower edge thereof, is a two part or sectional anchor plate 4 composed of sections having tongue and groove connections, as at 5, necessitating placing one section or part of the anchor plate down on the other and this anchor plate is held by screws 6 extending through a face plate 7 and the instrument board 3. The face plate 7 is mounted on the lower edge of the instrument board 3 and the heads 8 of the screws 6 are countersunk in the face plate 7 and concealed by closure plates 9 sprung into the face of the plate 7. The closure plates 9 are of a conventional form also the screws 6 and said screws simply represent a convenient fastening means by which the anchor plate 4 may be attached to the instrument board without any danger of the anchor plate being easily removed.

The parts or sections of the anchor plate 4 have lugs 10 and 11 confronting each other and provided with recesses 12. Mounted in one of the recesses is a pivot pin 13 which extends into the other recess and this is permissible by reason of the anchor plate being made in two parts or sections. Such construction also permits of the barrel end 14 of a lock casing cover 15 and the side apertured walls 16 of a channel lock casing 17 being mounted on the pin 13, prior to assembling the parts of the anchor plate 4. The cover 15 is adapted to be secured relative to the casing 17 so that said casing and cover will have a pivotal adjustment relative to the anchor plate 4, similar to a hinge hasp. The hinged lock casing 17 will compensate for any differences in the angularity of the steering shaft 2 relative to the instrument board 3, as such differences may occur in the large production of an automobile or in different makes of automobile.

The channel lock casing 17 has a hollow cylindrical head 18 through which extends the steering shaft 2, and set in said head is a sectional or two-part keeper member 19 having a plurality of radially disposed notches 20 and a hub portion 21 which fits about the steering shaft 2 and is fixed relative thereto by a key 22 or other fastening means which will establish a driving relation between the shaft 2 and the keeper member 19. The hub 21 of the keeper member extends into a bottom opening 23 of the head 18 and said keeper member is retained within the head by a screw cap 24 having a sleeve portion 25 extending between the casing 1 and the shaft 2, said sleeve portion serving as a bearing for the shaft 2 and a closure for the lower end of the casing 1.

The channel lock casing 17 serves as a guide for a latch or locking bolt 26 adapted to extend into either of the notches 20 of the keeper member 19 and prevent rotation of said keeper member and the steering shaft 2. Pivotally connected to the inner end of the locking bolt 26 is a link or pitman 27 pivotally connected to a wrist pin 28 on the face of a large gear wheel 29 rotatably supported by the inner end of a lock body 30, said lock body being fixed in the casing 17 and extending into a side wall 16 thereof.

The large gear wheel 29 meshes with a small gear wheel 31 on the inner end of a lock barrel 32 within the lock body 30 and adapted to be rotated by a key 33, which key may actuate spring pressed tumblers 34 in order that the barrel 32 may be released and rotated to actuate the lock. The ratio between the large and small gear wheels 29 and 30 is two to one, so that a complete revolution of the key and barrel will cause a half revolution of the large gear wheel and thus either extend the locking bolt 26 or retract the same. The extension of the locking bolt 26 is facilitated by a coiled expansion spring 35 interposed between the locking bolt 26 and the lock body 30 with one end of the spring seated in the locking bolt. Should the locking bolt fail to register with the notch 20 of the keeper member 19, the locking bolt will bear against the periphery of the keeper member until a notch presents itself, at which time the expansive force of the spring 35 will force the locking bolt into locking engagement with the keeper member. In order that this may take place without any interference by the connection of the pitman 27 with the large gear wheel 29, said pitman has its ends slotted, as at 36 to receive the wrist pin 28, consequently the large gear wheel 29 can be rotated even though the locking bolt 26 is held retracted by the keeper member 19.

The casing cover 15, besides being held by the pin 13, extends under the cap 24 and has a dowel pin connection 37 with said cap and said dowel pin connection prevents rotation of the cap 24. The casing cover 15 also has a beveled lip or lug 38 extending under or into the lock body 30 and the lug 38 will cooperate with the cap 24 in preventing removal of the cover or raising of the same until the parts or sections of the anchor plate 4 are separated.

From the foregoing it will be observed that the locking mechanism is safely housed so that it cannot be conveniently tampered with and the lock parts are fixed so that the same cannot be easily removed. All of this contributes to a lock that will prevent the steering shaft 2 from being turned except by an authorized person, and it is believed that the theft of automobiles will be materially reduced if automobiles are equipped with locks in accordance with my invention.

While in the drawing there is illustrated a preferred embodiment of my invention, it is to be understood that the structural elements are susceptible to such changes, in size, shape and manner of assemblage as fall within the scope of the appended claims.

What I claim is:—

1. A locking mechanism for an angularly disposed steering shaft in proximity to an instrument board, comprising an anchor plate composed of separable parts attached to said instrument board, a lock casing operatively held between ends of the anchor plate parts and by such connection compensating for differences of angularity between said steering shaft and said instrument board, and precluding removal of said lock casing until the anchor plate parts are separated, and locking means in said casing adapted to hold said steering shaft against rotation relative to said casing.

2. A locking mechanism for an angularly disposed steering shaft in proximity to an instrument board, comprising an anchor plate attached to said instrument board, a lock casing connected to said anchor plate and by such connection compensate for differences of angularity between said steering shaft and said instrument board, a keeper on said steering shaft inclosed by said casing, a cover for said casing, a lock barrel in said casing engaging a portion of said cover to assist in retaining it on said casing, and a key actuated bolt in said case operated from said lock barrel and adapted to engage said keeper and hold said steering shaft against rotation relative to said casing.

3. A locking mechanism as in claim 1, wherein said locking means includes a spring pressed bolt to engage said steering shaft, a key operated barrel, and gear wheels and a pitman connecting said barrel and bolt so that one revolution of said barrel will either retract or distend said bolt.

4. A locking mechanism for a steering shaft, comprising an anchor plate composed of separable parts normally connected together and adapted to be fixed adjacent said shaft, a lock casing hingedly mounted between the parts of said anchor plate and embracing said shaft, said anchor plate parts precluding removal of said lock casing until the anchor plate parts are separated, and locking means in said casing adapted to engage and lock said shaft against rotation.

5. A locking mechanism for a steering shaft, comprising an anchor plate, a lock casing, a pin supporting said locking casing relative to said anchor plate, a cover for said locking casing, having one end held by said pin, locking means in said casing adapted to engage and hold said steering shaft against rotation, and a cap about the steering shaft cooperating with said pin in retaining said cover closed relative to said casing.

In testimony whereof I affix my signature in presence of two witnesses.

LEON E. WILLETT.

Witnesses:
WESLEY E. GOULD,
KARL H. BUTLER.